Oct. 4, 1955  G. F. JENKINS  2,719,672
TEMPERATURE CONTROL APPARATUS HAVING NIGHT SETBACK
Filed Dec. 1, 1951
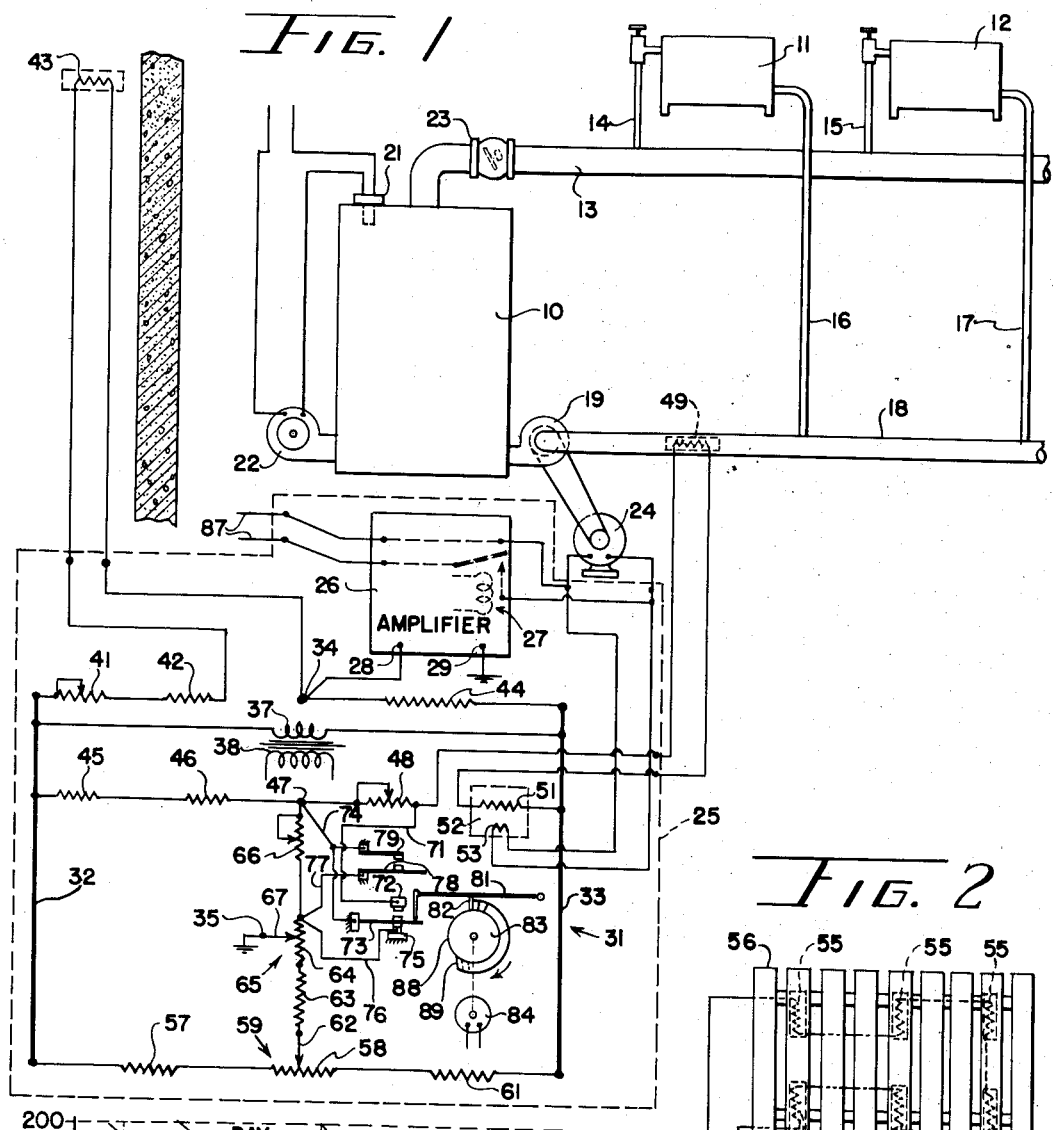
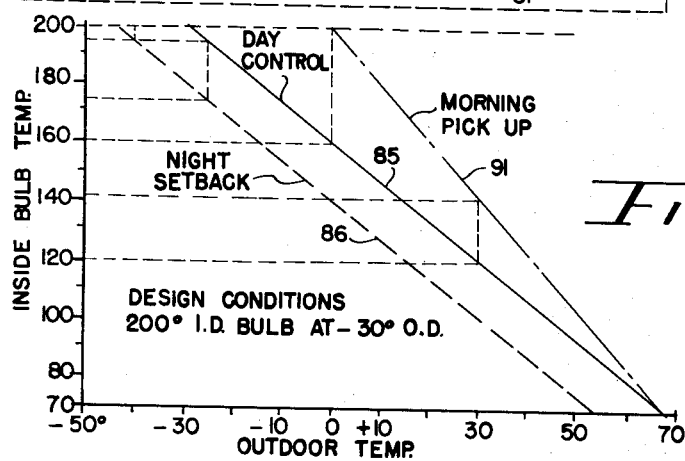
INVENTOR.
GEORGE F. JENKINS
BY
George H. Fisher
ATTORNEY

United States Patent Office 2,719,672
Patented Oct. 4, 1955

2,719,672

TEMPERATURE CONTROL APPARATUS HAVING NIGHT SETBACK

George F. Jenkins, Minneapolis, Minn., assignor to Minneapolis-Honeywell Regulator Company, Minneapolis, Minn., a corporation of Delaware Application December 1, 1951, Serial No. 259,400

4 Claims. (Cl. 236—46)

The present invention relates to an improved temperature control apparatus.

It is common practice to control a heating system to maintain one room temperature during the day and a lower temperature during the night and, where this control is effected by a room thermostat, no particular problem arises. Further, there is no apparent difficulty in raising the temperature from the night value to the day value for, during the morning pickup period, the modern thermostat tends to cause continuous operation of the heating plant only until the room temperature approaches the desired value. However, room thermostats are not used in some applications because of the difficulty of finding a properly representative room. In these cases, an outdoor controller of one sort or another is customarily used and night set-back is also common and offers no great problem. Morning pickup, though, is a more difficult matter and generally requires a complicated and expensive apparatus to give satisfactory results.

In the present invention, the temperature of the heating medium is varied inversely with variations in outdoor temperature; night set-back is effected by lowering the temperature of the medium a predetermined amount, and morning pickup is effected by altering the relative effect of the outdoor and medium temperature responsive apparatus for a predetermined time. By varying the relative authority of the outdoor and medium temperature responsive devices in a direction to provide a hotter medium than would normally be called for, the present system provides a temperature rise for the pickup period dependent on outdoor temperature and does this in a simple and effective manner. It is thus an object of this invention to provide an improved temperature control apparatus including provision for night set-back or shut-down and morning pickup.

It is a further object to provide a morning pickup arrangement for a temperature control system wherein the relative authority of a plurality of controllers is varied during a predetermined period.

These and other objects will become apparent upon the study of the following specification and drawings wherein:

Figure 1 is a schematic view of the present apparatus an applied to a hot water heating system.

Figure 2 is a schematic view of a modified arrangement for determining heating system temperature.

Figure 3 is a graphical representation of a control schedule that may be effected by the present apparatus.

As above suggested, temperature control apparatus of the present sort is generally used where no properly representative location for a room thermostat can be found or where it is undesirable for other reasons to use a room thermostat.

In the system of Figure 1, which may be taken as typical, boiler 10 supplies radiators 11 and 12 through supply main 13 and risers 14 anrd 15. The return risers 16 and 17 from radiators 11 and 12 connect to return main 18 which leads through circulator 19 back to boiler 10. The water temperature in boiler 10 is conveniently regulated by an Aquastat 21 controlling the energization of a burner 22, although any other suitable arrangement may be used. Flow valve 23 prevents circulation due to thermo-siphon action and opens only upon operation of the circulator 19, thus putting the circulator in control of the heat supply.

Circulator 19 is driven by motor 24 under control of apparatus generally designated by the numeral 25, said apparatus including an amplifier or electronic relay 26. Amplifier 26 may be of any suitable sort capable of pulling in its relay upon a signal of a predetermined phase being imposed on its input terminals, the one disclosed in Myron R. Smith Patent 2,604,267, issued July 22, 1952, being found quite satisfactory. Obviously, if D. C. be used in the present apparatus, relay apparatus 26 must be of the polarized sort. Amplifier 26 includes a relay 27 which, when energized, causes operation of motor 24, the amplifier 26 pulling in this relay when a signal of one phase is imposed on its input terminals 28 and 29 but is inoperative upon a signal of an opposite phase being imposed on said terminals.

Signals are impressed on amplifier 26 by a network circuit 31 having a plurality of parallel branches and having input terminals 32 and 33 and output terminals 34 and 35, output terminal 35 being shown as grounded, as is input terminal 29 of the amplifier but, in practice, these terminals are ordinarily not only grounded but connected together. The input terminals 32 and 33 of network 31 are energized by secondary winding 37 of transformer 38, the primary winding of this transformer being connected to a suitable power source, not shown.

The uppermost branches of network 31 comprise, reading from input terminal 32, a variable resistor 41, a fixed resistor 42, an outdoor temperature responsive resistor 43, output terminal 34 and a fixed resistor 44 connected to input terminal 33. Outdoor temperature responsive resistor 43 is preferably located outside the structure in question but shielded from direct rays of the sun. This resistor may be of any suitable sort but generally is made from wire having a relatively high temperature coefficient, such as nickel. The next lower pair of branches of the bridge are connected between the input terminals 32 and 33 and include a fixed resistor 45, a resistor 46, a tap 47, a night set-back variable resistor 48, a resistor 49 arranged to respond to a temperature indicative of the heating system temperature, such as return line temperature as indicated in Figure 1, and a cycler resistor 51 connected to the input terminal 33. Resistors 46 and 51 have substantially the same resistance value and both have appreciable temperature coefficients of resistance. Likewise, resistor 49 has an appreciable temperature coefficient and may also be made of nickel wire. Cycler resistor 51 is part of a device generally referred to as the cycler 52 and involves a lagged enclosure about resistor 51 and a heater element 53, resistor 51 being affected by the heat given off by 53, with the lagging of the device preventing too rapid a change in temperature. Resistor 46 serves as an ambient compensator for 51.

As an alternative to resistor 49, the resistance value of this device may be split into several parts, with the individual resistors 55 attached to the surface of a radiator 56 or the like, as shown in Figure 2, this arrangement being used to arrive at a resistance indicative of the average temperature of the radiator.

The next of the parallel branches includes a fixed resistor 57, resistor 58 of potentiometer 59 and fixed resistor 61, these resistors also being connected in series between the input terminals 32 and 33. Wiper 62 of potentiometer 59 is connected through a fixed resistor 63, resistor 64 of potentiometer 65 and a variable resistor 66 to tap 47. Wiper 67 of potentiometer 65 is connected to grounded terminal 35 and thus is part of one of the output circuits of the network. The last mentioned resistors connected between wiper 62 and tap 47, in connection with the output terminal 35, constitutes what is known as an authority control, an adjustment of the resistance tending to place the output terminal 35 nearer to wiper 62 tending to minimize the effect of resistors 49, 46 and 51, whereas an adjustment of terminal 35 nearer to tap 47 tends to increase the effect of these resistors. The adjustment of resistor 48 affects the temperature of the heating system to be maintained for any particular temperature at resistor 43 and is referred to as a night set-back adjustment because it is made effective or ineffective by a shunt circuit extending from the right end of resistor 48 through wire 71 to switch contact 72, switch blade 73, when the switch is properly operated, and wire 74 to tap 47. As shown, switch blade 73 is not engaging contact 72, hence resistor 48 is in the circuit and thereby permits a balanced bridge with a lower temperature at 49 than would otherwise be the case. Resistor 66, known as the morning pickup resistor, is also controlled by a shunt circuit extending from tap 47 through wire 74 and switch blade 73 to contact 75 and wire 76 to the upper end of resistor 64. Another shunt circuit from this resistor extends from the upper end of resistor 64 through wire 77 to switch blade 78 which engages a stationary contact 79 connected to wire 74, this circuit operating to short circuit resistor 66 when switch blade 78 engages contact 79. The above described switches are operated by a pivoted arm 81 having a follower 82 riding on an adjustable cam 83 driven by a motor and gear train 84 at the rate of one revolution per 24 hours. Cam 83 and its driving motor and gear train may be of any suitable sort but preferably an arrangement such as shown in Kronmiller Patent 2,558,617, issued June 26, 1951, is preferred. For convenience, the resistance values used in an example of the present apparatus are listed in the following table:

| | Ohms |
|---|---|
| 41 | 20 |
| 42 | 125 |
| 43 | 375 |
| 44 | 533 |
| 45 | 468 |
| 46 | 70 |
| 48 | 60 |
| 49 | 500 |
| 51 | 70 |
| 55 | 83.3 |
| 57 | 1,000 |
| 58 | 40 |
| 61 | 1,060 |
| 63 | 2,700 |
| 64 | 10,000 |
| 66 | 10,000 |

To better describe the function of the above apparatus, a representative operation schedule will now be traced.

*Operation*

With the apparatus arranged as shown in Figure 1, resistor 41 is adjusted to establish the resistance available in the outdoor branch of the bridge to thereby determine the temperature of heating medium that must be supplied for a predetermined or fade out outdoor temperature. Resistor 48 is adjusted to provide for a predetermined lowering of the heating system temperature during the night. Potentiometer 59 is adjusted to balance the bridge under predetermined conditions, such as when the medium temperature is correct for a particular outdoor temperature, and potentiometer 65 is adjusted to vary the authority of the medium temperature responsive means. This adjustment determines the degree of change of medium temperature to match a predetermined degree of outdoor temperature change. Referring to Figure 3, the adjustment of potentiometer 65 determines the slope of curve 85 and, for any particular fade-out point such as 68°, the medium temperature should, for instance, be approximately 70°. Then, with the adjustment as shown, at −30°, the medium temperature or heating system temperature must be 200°. An adjustment on the aforementioned authority potentiometer 65 will determine whether the uppermost temperature of the system will fall at one outside temperature or another. Referring again to Figure 3, curve 86 represents that followed when the apparatus is at night set-back and is observed to be parallel to curve 85 and displaced below it by about 21° so that the medium temperature, or heating system temperature, will be maintained 21° lower at night than during the day.

With the apparatus as shown, follower 82 has just fallen off the high dwell of cam 83 and has opened the shunt circuit along resistor 48, thereby starting the night set-back. Assuming that relay 27 is open and the bridge is balanced, a cooling of resistor 49 below a value required by curve 86, indicating a lower temperature in the heating system than is required, will cause an unbalance of the network in a direction to pull in the relay 27 and thereby cause operation of motor 24 by a circuit traced from line wires 87 through the relay of the amplifier and to the motor 24. Also, heater 53 on cycler 52 is energized in parallel with motor 24 and causes a temperature rise at 51, this temperature rise anticipating, in effect, the rise in temperature at 49 due to operation of the circulator moving hot water through the system. This cycler 52 and its ambient compensator 46 are generally considered necessary in heating systems having considerable lag between the energization of the circulator, for instance, and the delivery of heat to the radiators or the like. However, in smaller systems or wherever the rate of circulation is adequate, cycler 52 and its compensator 46 may be eliminated.

Upon a sufficient rise in temperature at resistor 49 and/or resistor 51, to balance the network, the signal causing energization of relay 27 is eliminated and the relay opens, with the consequent stopping of the circulation and the supply of heat. As resistor 43 is in a diagonally opposite branch on the network, a drop in temperature at resistor 43 will also result in an unbalance of the network in a direction calling for more heat and this unbalance can be corrected only by increasing the resistance of resistor 49 by operating it at a higher temperature.

As cam 83 rotates and follower 82 travels along night portion 88 of the cam, the temperature to be maintained at 49 will follow along curve 86 to thus provide a predetermined heating system temperature for any particular outdoor temperature. Upon the follower striking the rise portion 89 of the cam, switch blade 73 moves out of engagement with contact 75 and into engagement with contact 72. The effect of this is to close the aforementioned shunt circuit around resistor 48 and thus require a higher operating temperature in the heating system sufficient to increase the resistance of 49 sufficiently to offset the value of 48 which has just been removed from the circuit. This tends to make the system temperature follow curve 85. However, the closing of switch blade 73 with contact 72 opens a shunt circuit previously traced around resistor 66 and, as the other shunt circuit around resistor 66 going through switch blade 78 and contact 79 is still open, resistor 66 is now effectively in the authority control circuit and operates to place more resistance between output terminal 35 and tap 47. This lessens the authority of resistor 49 or, in other words, it operates to require a proportional increase in temperature and resistance at 49 to match any particular temperature at resistor 43. By thus requiring a proportionally greater change at resistor 49, or resistors 55 in Figure 2, the slope of the curve followed by the heating system temperature versus outside temperature is changed, with curve 91 of Figure 3 representing this morning pickup curve. Because only the slope of the curve is changed by the change in authority and because the fade out temperature remains constant, the net result is the requiring of higher system temperature than normal during the morning pickup period, with the amount of increased temperature being a function of the outside temperature. For instance, at +30° outside temperature, about 120° would normally be required for day operation but about 142° is required during the morning pickup period, giving a temperature rise of about 22°. At a zero outside temperature, about 160° would be maintained during the day but a 200° temperature is required during the morning pickup period, thus giving a temperature rise of 40°. Thus, by use of the present circuit, a simple timer operating on and off switches at fixed periods is effective to give a morning pickup temperature for a heating system exactly matched to the requirements. Obviously, the amount of change of slope of curve 91 is determined by the adjustment of resistor 66 hence, if it should be found that any particular adjustment gives too much or too little heat during the morning pickup period, a simple adjustment of this resistor is all that is needed to establish a new curve for the morning pickup. Obviously, the timing of the day, night and pickup periods can be adjusted by adjusting cam 83.

A study of the preceding drawings and specification will reveal many substitutions and equivalents, hence the scope of the present invention should be determined only by the appended claims.

I claim:

1. In a temperature control apparatus; a temperature changing apparatus; network circuit means for controlling said temperature changing apparatus, said network circuit comprising a pair of input terminals and a plurality of parallel branches connected between said terminals; a first branch including a tap, a resistor, and temperature responsive resistance means, said temperature responsive means being responsive to the output of the condition changing apparatus; a second branch including a resistor with a movable tap; a third branch including a tap and second temperature responsive resistance means, said second responsive means being responsive to the outdoor temperature; impedance means including a resistor with a movable tap thereon for connecting said tap of the first branch and said movable tap of the second branch; relay means for controlling the temperature changing apparatus; circuit connection means connecting said relay means to said last mentioned movable tap and said tap of the third branch, thereby a predetermined schedule is maintained between the outdoor temperature and the output of the temperature changing apparatus; first switch means for inserting said resistor in the first branch to linearly reduce the output of the temperature changing apparatus with respect to that normally obtained for various outdoor temperatures; second switch means for modifying said impedance means to nonlinearly increase the output of the temperature changing apparatus with respect to that normally obtained for various outdoor temperatures; and timer means for operating said first and second switch means upon a predetermined schedule so that a linear reduction in heat supply is provided for night setback and a non-linear increase in heat supply is provided for morning pickup.

2. In temperature control apparatus, means for controlling a temperature changing apparatus, balanceable network circuit means for controlling said controlling means, said network circuit comprising a pair of input terminals and a plurality of parallel branches connected between said terminals, a first branch including a tap and an electrical impedance means variable in accordance with a condition indicative of heat supply, a second said branch including a pair of relatively fixed impedances and having a tap therebetween, a third branch of said network including an impedance variable in response to heating load, said third branch also including a tap, means for varying the effective value of an impedance in one of said branches, voltage divider circuit means connected between the taps of the first and second branches and including an outlet connection for said network, the tap of the third branch constituting the other output connection for the network, said impedance varying means adapted to reduce the heat supply for night setback, shunt circuit means arranged to change the division of voltage by modifying said voltage divider circuit to increase the heat supply for pickup, switch means for controlling said shunt circuit, and motor means for periodically operating said switch and said impedance varying means.

3. A temperature control apparatus comprising a relay means for energizing heat controlling means, a balanceable electric network circuit connected in controlling relation to said relay means, said network including a plurality of parallel branches, one of said branches including an impedance variable in response to a condition indicative of heat load, a second of said branches including an impedance variable in response to a condition indicative of heat supply, a third of said branches including relatively fixed impedances, circuit means for connecting one of the branches having a variable impedance to said third branch, the impedance of said circuit means determining the authority of said branches having variable impedances, first switch means for changing the impedance of said one of the branches to provide night setback, second switch means for changing the impedance of said circuit means to provide for morning pickup, and timer means for selectively operating said first and second switch means.

4. A temperature control apparatus comprising relay means for controlling a supply of heat, a balanceable electric network circuit connected in controlling relation to said relay means, said network circuit including a plurality of parallel branches, one of said branches including an impedance variable in response to a condition indicative of heat load, a second of said branches including an impedance variable in response to a condition indicative of heat supply, a third of said branches including relatively fixed impedances, circuit means for varying the authority and connecting one of the branches having a variable impedance relative to the third branch and thereby varying its authority relative to the other branch having a variable impedance, night set-back means for effectively adjusting one of said impedances for varying the balance of said network, circuit means for adjusting said authority varying circuit means, and motor means for operating said night set-back means and said authority circuit means.

References Cited in the file of this patent

UNITED STATES PATENTS

| | | |
|---|---|---|
| 2,136,559 | Miller | Nov. 15, 1938 |
| 2,236,624 | Littwin | Apr. 1, 1941 |
| 2,271,651 | Kucera | Feb. 3, 1942 |
| 2,291,840 | Spangenberg | Aug. 4, 1942 |
| 2,547,933 | FitzGerald | Apr. 10, 1951 |
| 2,556,973 | Nickells | June 12, 1951 |
| 2,604,267 | Smith | July 22, 1952 |

FOREIGN PATENTS

| | | |
|---|---|---|
| 125,342 | Australia | Sept. 4, 1947 |
| 505,797 | Great Britain | May 17, 1939 |
| 778,692 | France | Jan. 2, 1935 |